J. SNOW.
ANIMAL TRAP.
APPLICATION FILED JAN. 11, 1909.
925,847.
Patented June 22, 1909.
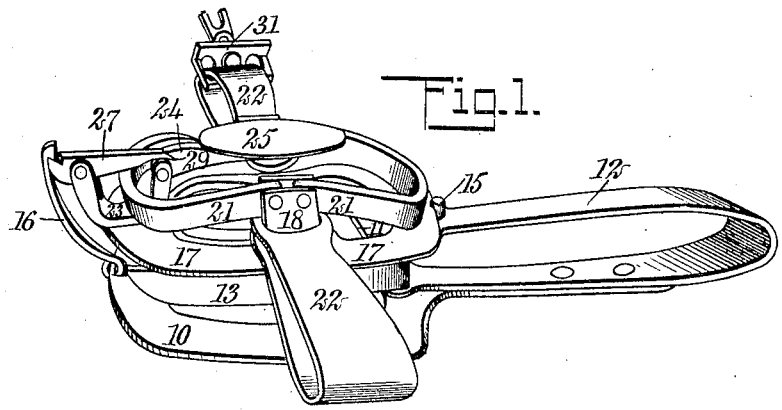
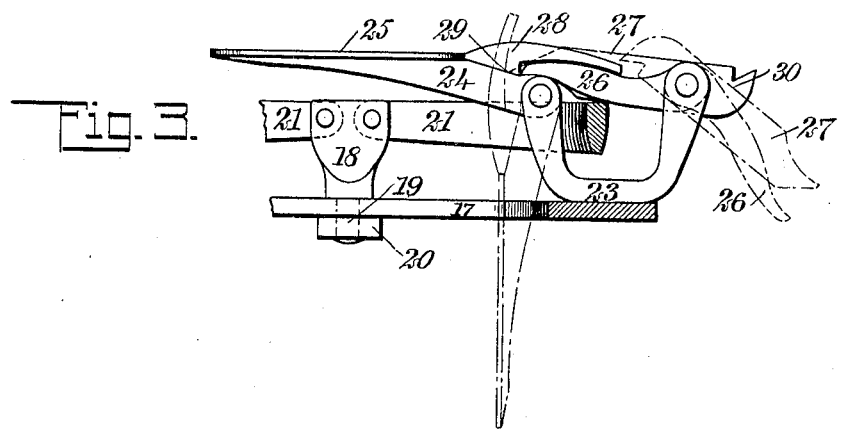
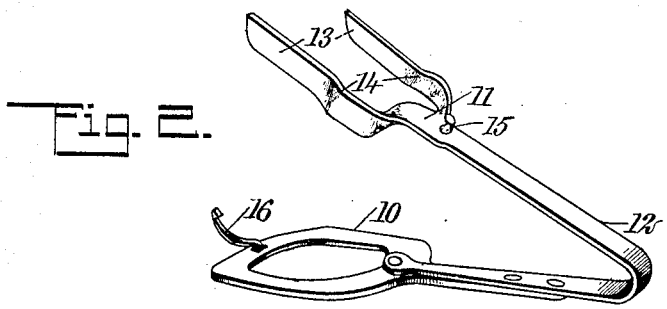
WITNESSES
L. Almquist
E. B. Marshall
INVENTOR
Joshua Snow
BY Munn & Co
ATTORNEYS

UNITED STATES PATENT OFFICE.

JOSHUA SNOW, OF FALUN, MINNESOTA.

ANIMAL-TRAP.

No. 925,847.     Specification of Letters Patent.     Patented June 22, 1909.

Application filed January 11, 1909. Serial No. 471,577.

*To all whom it may concern:*

Be it known that I, JOSHUA SNOW, a citizen of the United States, and a resident of Falun, in the county of Roseau and State of Minnesota, have invented a new and Improved Animal-Trap, of which the following is a full, clear, and exact description.

My invention relates to animal traps, and has for its object to provide a trap having an open bottom permitting an animal to put his foot clean through the trap, so that the trap will become fastened well above the foot.

Another object of the invention is to provide an animal trap which will throw its jaws up the leg of the animal some distance, making it impossible for the animal to escape by chewing away his foot, which is often the case with the old style trap.

Another object of the invention is to provide an animal trap which will work equally well in deep snow, for the trap will come up and the jaws will catch the animal's foot, while in the old style of trap the jaws will not touch the foot.

Another object of the invention is to provide an animal trap which it is impossible for a fox or mink to spring without being caught.

Still other objects of the invention will appear in the following complete description.

In this specification I will describe the preferred form of my invention, but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a perspective view of my invention; Fig. 2 is a perspective view showing the base members with the spring to which they are secured; and Fig. 3 is a fragmentary sectional view showing the dog engaging the recess in the shank and the trip pan, the dog being pressed backwardly by one of the jaws.

By referring to the drawings, it will be seen that there are two base members 10 and 11, and that these base members 10 and 11 are secured together by a spring portion 12, which tends to hold the base members 10 and 11 yieldingly apart. The lower base member 10 has a flat lower portion to permit it to rest evenly on the ground, while the upper base member 11 is bifuracted, the bifurcated portions 13 each having an inner lateral recess 14. A stud 15 is secured to the upper base member 11, and to the lower base member 10 is pivoted a latch 16. On the upper base member 11 is disposed a frame 17, the frame 17 resting in an indenture in the stud 15. To the frame at either side are secured flanges 18, the flanges 18 terminating in threaded shanks 19 which are disposed in orifices in the frame 17, nuts 20 being screwed on the threaded shanks 19, to hold the flanges in place, these nuts 20 resting in the recesses 14, in the upper base member 11.

To the flanges 18 are pivoted jaws 21, in the customary manner; there being the usual double leaf springs 22 with orifices in which the flanges 18 are disposed. Opposite the stud 15 there is secured to the frame 17, which is open in the middle, a U-shaped support 23, to the inner arm of which is pivoted the shank 24 of a trip pan 25 and to the outer arm of the U-shaped support are pivoted two dogs 26 and 27, the dog 26 being normally disposed under an arm 28 which is secured to the shank 24 of the trip pan and the dog 27 being adapted to engage a recess 29 in the shank 24 of the trip pan. The outer or short arm of the dog 27, which is pivoted as a lever, has a hook 30, with which the latch 16 is adapted to engage.

In using my invention, the jaws 21 are opened and one of them is disposed under the dogs 26 and 27, when the trip pan 25 is raised and the dog 27 is disposed in the recess 29 in the shank 24 of the trip pan and the dog 26 is disposed under the arm 28, the jaws being held open when the trip pan and the dogs are thus disposed. The frame 17 is then disposed on the upper base member 11 with the U-shaped support disposed away from the stud and with the frame 17 disposed in the recess in the said stud. The upper base member is then pressed downwardly, compressing the spring 12 until it is possible to secure the latch 16 to the hook 30, when the trap is ready for use. It will be seen that as the frame 17 and the base members 10 and 11 have their centers open, the animal may step to the ground without coming in contact with any part of the trap, but when the trip pan 25 is touched it frees the dog 27, which releases the latch 16, and the spring 12 throws the upper base member 11 upwardly, but the dog 26 sufficiently delays the closing of the jaws 21 after the dog 27 has been freed therefrom to permit the spring 12 to throw the frame 17 upwardly with some force before the jaws 21 grip the leg of the animal. The jaws therefore grip the animal's leg at a distance from its paw.

To one of the springs 22 or to the frame is secured a member 31 to which a chain may be secured to prevent the animal from walking away with the trap.

Having thus described my invention, I claim as new and desire to secure by Letters Patent:

1. In an animal trap, a frame, jaws pivoted to the frame, a spring which is adapted for closing the jaws, a base member on which the frame is disposed, means for holding the base member yieldingly upward, a trip pan pivoted to the frame, means in connection with the trip pan which are adapted for holding the jaws open, and means in connection with the last named means which are adapted for holding the base member down.

2. In an animal trap, a frame, jaws pivoted to the frame, a spring which is adapted for closing the jaws, a base member on which the frame is disposed, means for holding the base member yieldingly upward, a trip pan pivoted to the frame, means in connection with the trip pan which are adapted for holding the jaws open, means in connection with the last named means which are adapted for holding the base member down, and means in connection with the means for holding the base member down which are adapted for holding the frame secured to the base member when the trap is set.

3. In an animal trap, a frame, jaws pivoted to the frame, a spring which is adapted for closing the jaws, a base member on which the frame is disposed, means for holding the base member yieldingly upward, a pivoted trip pan, means in connection with the trip pan which are adapted for holding the jaws open, means in connection with the last named means which are adapted for holding the base member down, and means on the base member which are adapted for engaging the frame when the second named means are in operative position.

4. In an animal trap, a frame, jaws pivoted to the frame, a spring which is adapted for closing the jaws, a base member on which the frame is disposed, means for holding the base member yieldingly upward, a pivoted trip pan, means in connection with the trip pan which are adapted for holding the jaws open, means in connection with the last named means which are adapted for holding the base member down, means on the base member adapted for engaging the frame when the second named means are in operative position, and means for preventing the lateral movement of the frame relatively to the base member.

5. In an animal trap, a frame, jaws pivoted to the frame, means which are adapted for closing the jaws, means for throwing the frame a distance, means for holding the jaws open, and means in connection with the last named means adapted for holding the frame in an inoperative position.

6. In an animal trap, a frame, jaws pivoted to the frame, means which are adapted for closing the jaws, means for throwing the frame a distance, a trip pan, means in connection with the trip pan which are adapted for holding the jaws open, and means in connection with the last named means which are adapted for holding the means for throwing the frame in an inoperative position.

7. In an animal trap, a frame, jaws pivoted thereto, means for closing the jaws, a pivoted trip pan, a dog which is adapted for engaging the trip pan, the dog being adapted for holding the jaws open, a base member on which the frame is disposed, and a latch which is adapted for engaging the dog and holding the frame on the base member.

8. In an animal trap, a frame, jaws pivoted thereto, means for closing the jaws, a pivoted trip pan, a dog which is adapted for engaging the trip pan, the dog being adapted for holding the jaws open, means for throwing the frame a distance, and a latch which is adapted for engaging the dog.

9. In an animal trap, a frame, jaws pivoted thereto, means for closing the jaws, a trip pan pivoted to the frame, there being a recess in the trip pan, a dog which is adapted for engaging the recess in the trip pan, the dog being adapted for holding the jaws open, two base members, a spring which is adapted for holding the base members yieldingly apart, the frame being disposed on one of the base members, and a latch pivoted to the other base member, the latch being adapted for engaging the dog.

10. In an animal trap, a frame, jaws pivoted thereto, means for closing the jaws, a support secured to the frame, a trip pan pivoted to the support, a dog pivoted to the support, one end of which is adapted for engaging the trip pan, the dog being adapted for holding the jaws open, means for throwing the frame a distance, and a latch on the last named means which is adapted for engaging the other end of the dog.

11. In an animal trap, a frame, jaws pivoted thereto, means for closing the jaws, a trip pan movable in the frame, means adapted for holding the jaws open, said means being also adapted for holding the trip pan in a set position, a base member on which the frame is disposed, a latch adapted for engaging the means for holding the jaws open for assisting in holding the frame on the base member, and additional means for holding the frame on the base member.

12. In an animal trap, a frame, jaws pivoted thereto, means for closing the jaws, a support secured to the frame, a trip pan pivoted to the support, the trip pan having an arm extending from its shank and projecting over its pivoted portion, a pivoted dog disposed under the arm, a second dog pivoted to the support, one end of which is adapted for engaging the trip pan, the second dog being adapted for holding the jaws open, means for throwing the frame a distance, and a latch on the last named means which is adapted for engaging the other end of the last named dog.

13. In an animal trap, a frame, jaws pivoted to the frame, a spring which is adapted for closing the jaws, a base member on which the frame is disposed, means for holding the base member yieldingly upward, a trip pan movable in the frame, means in connection with the trip pan, adapted for holding the jaws open, and means in connection with the last-named means, adapted for holding the base member down.

In testimony whereof I have signed my name to this specification in the presence of two subscribing witnesses.

JOSHUA SNOW.

Witnesses:
R. H. MEDICRAFT,
SIGURD BRUDE.